United States Patent
Hyvonen et al.

(10) Patent No.: US 9,368,956 B2
(45) Date of Patent: Jun. 14, 2016

(54) ELECTROSTATIC DISCHARGE CLAMP COMPATIBLE WITH A FAST RAMPING SUPPLY

(75) Inventors: Sami Hyvonen, Beaverton, OR (US); Chinmay P. Joshi, Portland, OR (US); Timothy J. Maloney, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 13/996,098

(22) PCT Filed: Mar. 22, 2012

(86) PCT No.: PCT/US2012/030157
§ 371 (c)(1),
(2), (4) Date: Jun. 20, 2013

(87) PCT Pub. No.: WO2013/141864
PCT Pub. Date: Sep. 26, 2013

(65) Prior Publication Data
US 2013/0308234 A1    Nov. 21, 2013

(51) Int. Cl.
*H02H 3/20* (2006.01)
*H02H 9/04* (2006.01)

(52) U.S. Cl.
CPC .............. *H02H 3/20* (2013.01); *H02H 9/046* (2013.01); *H02H 9/041* (2013.01)

(58) Field of Classification Search
CPC .......... H02H 3/20; H02H 9/046; H02H 9/041
USPC ............................................................ 361/56
See application file for complete search history.

(56) References Cited

U.S. PATENT DOCUMENTS

| | | | | |
|---|---|---|---|---|
| 5,946,177 A * | 8/1999 | Miller et al. | | 361/56 |
| 5,978,192 A * | 11/1999 | Young et al. | | 361/56 |
| 7,164,565 B2 * | 1/2007 | Takeda | | 361/56 |
| 2006/0176626 A1 | 8/2006 | Griesbach et al. | | |
| 2011/0241570 A1 | 10/2011 | Nguyen | | |

FOREIGN PATENT DOCUMENTS

JP    2007/059444    3/2007

OTHER PUBLICATIONS

International Preliminary Report on Patentability for International Application No. PCT/US2012/030157, mailed Oct. 2, 2014, 8 pages.
First Notification for Rectification issued for Chinese Patent Application No. 201320131971.0, mailed Jun. 27, 2013.
International Search Report and Written Opinion issued for International Patent Application No. PCT/US2012/030157, mailed Nov. 29, 2012, 11 pages.

* cited by examiner

*Primary Examiner* — Scott Bauer
(74) *Attorney, Agent, or Firm* — Blakely, Sokoloff, Taylor & Zafman LLP (57) ABSTRACT

Described herein is an apparatus and system of an electrostatic discharge circuit. The apparatus comprises: a clamp transistor with a terminal coupled to a node with a power supply; and a detector to determine when the power supply crosses a first threshold, the detector to generate a trigger signal to cause the clamp transistor to remain off when the power supply on the node is below the first threshold.

17 Claims, 8 Drawing Sheets

ELECTROSTATIC DISCHARGE CLAMP COMPATIBLE WITH A FAST RAMPING SUPPLY

CLAIM OF PRIORITY

This application claims the benefit of priority of International Patent Application No. PCT/US2012/030157 filed Mar. 22, 2012, titled "ELECTROSTATIC DISCHARGE CLAMP COMPATIBLE WITH A FAST RAMPING SUPPLY," which is incorporated by reference in its entirety.

BACKGROUND

Electrostatic discharge (ESD) clamps are used for clamping ESD events such as those defined by the Human Body Model (HBM), Charged-device Model (CDM), Machine Model (MM), and Transmission-Line Pulse Model (TLP), etc. in the Joint Electron Devices Engineering Council (JEDEC) Solid State Technology Association.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

A typical ESD clamp consists of a Resistor-Capacitor (RC) timer to turn on an ESD clamp transistor during an ESD event, and to keep the ESD clamp transistor on for long enough time (typically 1 µs) during an HBM event. The term "turning on" an ESD clamp transistor refers generally to enabling an ESD circuit to discharge ESD currents/voltages from a power supply node to a ground node to protect other circuits coupled to the power supply node from being damaged due to ESD currents/voltages.

However, such typical ESD clamps are unable to distinguish between fast ramping power supplies from an ESD event (e.g., an HBM event). For example, reducing the RC time constant to keep the traditional ESD clamp off during fast ramp of power supply may result in the traditional ESD clamp turning off prematurely during an HBM event.

The embodiments of the ESD clamp circuit discussed herein allow for fast ramping power supplies to operate without turning on the ESD clamp while providing ESD protection (by turning on the ESD clamp) when an ESD event occurs (e.g., an HBM event). The embodiments of the ESD clamp circuit discussed herein also provide circuit area scaling for future process technologies. Other technical effects are contemplated by the embodiments discussed herein.

The term "scaling" herein refers generally to transferring the circuit design and layout from one process technology to another process technology.

The term "fast ramp" herein refers generally to a power supply having a rising/falling slope of more than 1V/µs. For example, 1V/50 ns is a fast ramp.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on".

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. The term "substantially" herein refers to being within 10% of the target.

For purposes of the embodiments described herein, the transistors are metal oxide semiconductor (MOS) transistors, which include drain, source, gate, and bulk terminals. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The terms "MN" herein indicates an n-type transistor (e.g., NMOS, NPN BJT, etc) and the term "MP" indicates a p-type transistor (e.g., PMOS, PNP BJT, etc).

Figure 1:
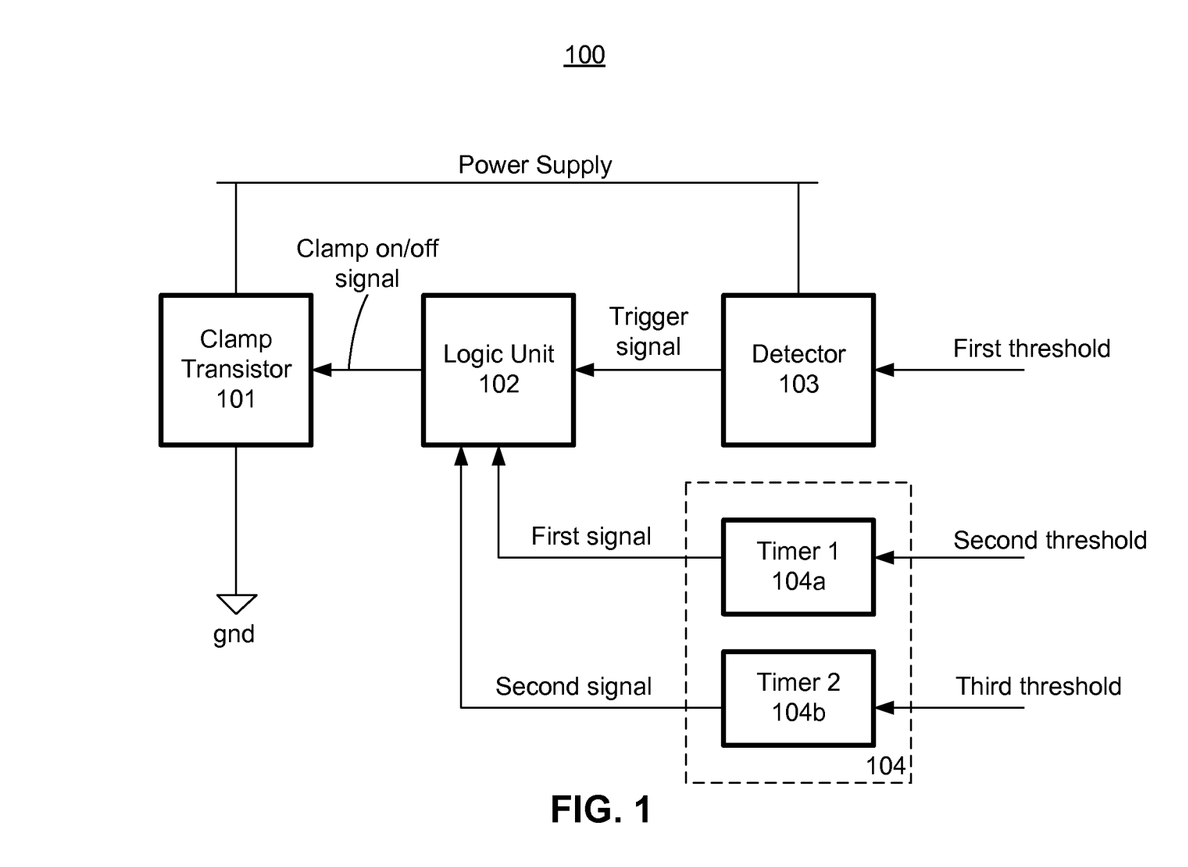
FIG. 1 is an electrostatic discharge (ESD) circuit compatible with a fast ramping power supply, according to one embodiment of the disclosure.

FIG. 1 is an ESD circuit 100 operable with a fast ramping power supply, according to one embodiment of the disclosure. In one embodiment, the ESD circuit 100 comprises a clamp transistor 101, a logic unit 102 to turn on/off the clamp transistor 101, a detector 103 to provide control signal(s) to the logic unit 102, a timer 104 to provide control signals(s) to the logic unit 102 to determine when (i.e., the duration) to turn on/off the clamp transistor 101.

In one embodiment, the ESD clamp transistor 101 is coupled between the power supply node and ground. In one embodiment, the ESD clamp transistor 101 is a p-type transistor (e.g., a PMOS, BJT PNP). In other embodiments, the ESD clamp transistor 101 is an n-type transistor (e.g., a NMOS, BJT NPN). While the embodiments herein describe the ESD clamp transistor 101 as a PMOS transistor, any transistor may be used as the ESD clamp transistor which is capable of conducting an ESD current.

In one embodiment, the detector 103 is a voltage trigger detector to detect an operating level of the power supply in view of a first threshold. In one embodiment, the first threshold is a voltage threshold. In other embodiments, a current threshold may be used to detect an operating level of the power supply. In one embodiment, the first threshold is an internally generated signal i.e., generated by the detector 103. In other embodiments, the first threshold is input to the detector 103 and is generated by another circuit or source (not shown).

The term "operating level" herein refers to minimum level of power supply that will cause a logic gate (e.g., an inverter, NAND gate) or transistor to functionally operate.

In one embodiment, the detector 103 is operable to generate a trigger signal for the logic unit 102 when the power supply voltage reaches the first threshold voltage level during the ramp of the power supply or during an ESD event. In one embodiment, the trigger signal from the detector 103 causes the clamp transistor 101 to remain off until the power supply reaches and/or crosses the first threshold.

For example, the detector 103 generates a low-to-high trigger signal when the power supply reaches the first threshold from a logical low level. In such an embodiment, the detector 103 forces the clamp transistor 101 to remain off by keeping the trigger signal at logical low level until the power supply reaches and/or crosses the first threshold.

In one embodiment, after the power supply voltage level goes above first threshold level (also referred herein as the voltage trigger level), the turning on of the clamp transistor 101 is controlled by the timer 104. In one embodiment, the timer 104 generates two signals—first and second signals—to control the turning on of the clamp transistor 101.

In one embodiment, the timer 104 comprises two timers—timer 104a and 104b—to generate the first and second signals respectively. In one embodiment, the timer 104a is operable to generate the first signal when a counter of the timer 104a reaches a target cycle count determined by the second threshold. In one embodiment, the second threshold is 20 ns. In other embodiments, other values for the second threshold may be used. In one embodiment, the first timer 104a is an RC timer. In another embodiment, the first timer 104a is a digital counter. In another embodiment, the first timer 104a is a ring-oscillator coupled to a counter. In other embodiments, other forms of timing circuits may be used.

In one embodiment, the second timer 104b is operable to generate the second signal when a counter of the second timer 104b reaches a target cycle count determined by a third threshold. In one embodiment, the third threshold is 2 µs. In other embodiments, other values for the third threshold may be used. In the embodiments discussed herein the third threshold value is greater than the second threshold value. In one embodiment, the second timer 104b is an RC timer. In another embodiment, the second timer is a digital counter. In another embodiment, the second timer 104b is a ring-oscillator coupled to a counter. In other embodiments, other forms of timing circuits may be used.

In one embodiment, the logic unit 102 may be implemented to perform the following function.

Turn clamp transistor 101 on only when (otherwise off): Power Supply>first voltage threshold (or $V_{trigger}$ as discussed with reference to FIGS. 3-4) AND when first timer 104a has not timed out (i.e., the first signal has not asserted indicating that the second time threshold has not been reached by the timer 104a).

Figure 2:
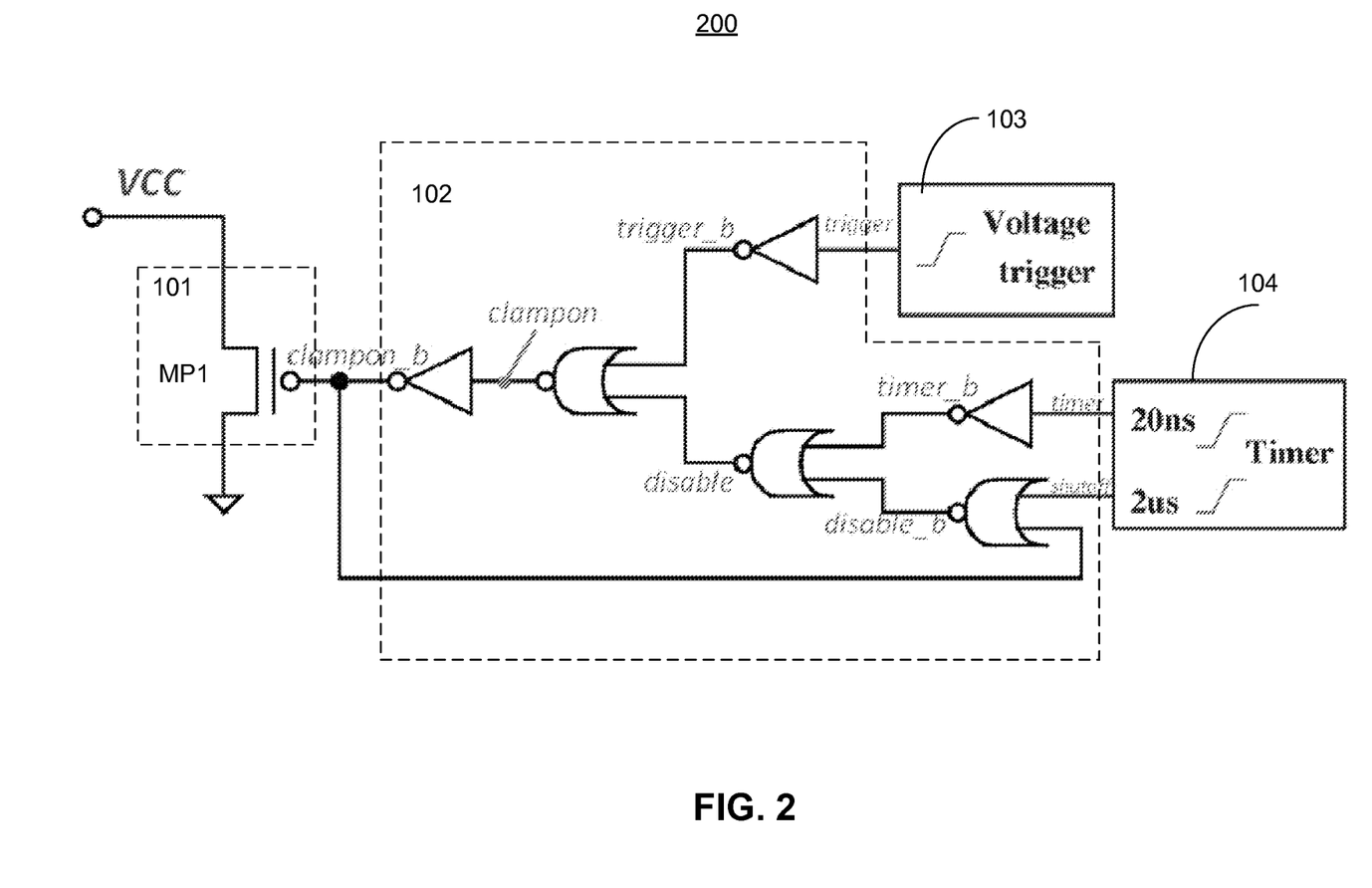
FIG. 2 is an ESD circuit, according to one embodiment of the disclosure.

FIG. 2 is an ESD circuit 200, according to one embodiment of the disclosure. FIG. 2 is described with reference to FIG. 1. In one embodiment, the ESD circuit 200 comprises the clamp transistor 101 which is a p-type transistor with its source terminal coupled to the power supply VCC, its drain terminal coupled to ground, and its gate terminal coupled to an output of the logic unit 102.

In one embodiment, the detector 103 is a voltage trigger circuit. One embodiment of the voltage trigger circuit is discussed with reference to FIG. 5. Referring back to FIG. 2, the ESD circuit 200 further comprises the timer 104. In one embodiment, the timer 104 comprises at least two timers 104a and 104b. In other embodiments, a single timer 104 may be designed to generate the first and second signals. The first signal from the timer 104 is referred herein as the "timer" signal. The second signal from the timer 104 is referred herein as the "shutoff" signal. The shutoff signal is asserted/de-asserted after the timer signal is asserted/de-asserted.

In one embodiment, the clamp transistor MP1 101 is sized to be large enough to conduct the large ESD current from the power supply node to ground. In one embodiment, the gate terminal of the clamp transistor MP1 101 is controlled by two mechanisms. The first mechanism is the trigger signal from the voltage trigger 103 and the second mechanism are the timing signals—timer and shutoff signals—from the timer 104.

In one embodiment, the voltage trigger 103 generates a low-to-high trigger signal when the voltage at the power supply VCC reaches the first voltage threshold level during the ramp of the power supply VCC or during an ESD event. In such an embodiment, when the power supply VCC reaches the first threshold voltage level, the output trigger signal from the voltage trigger detector 103 stays low, and causes the gate terminal of clamp transistor MP1 i.e., gate node clampon_b, to be high, preventing the clamp transistor MP1 101 from turning on.

In one embodiment, after the power supply VCC goes above the first threshold voltage level, the clamp transistor 101 turn-on operation is controlled by the timer 104. In one embodiment, the timer 104 comprises a ring oscillator and a digital counter that scales well across process technologies. In one embodiment, the timer 104 is operable to generate two timing signals—timer and shutoff signals. In this exemplary embodiment, the two timing signals transition from low-to-high when the counters of the timer 104 reach their respective target cycle count. In one embodiment, the target cycle count for transitioning the timer signal from low-to-high is after about 20 ns, and about 2 us for the shutoff signal. Other internal signals—clampon, trigger_b, disable, disable_b, timer_b—are discussed with reference to FIGS. 3-4.

Figure 3:
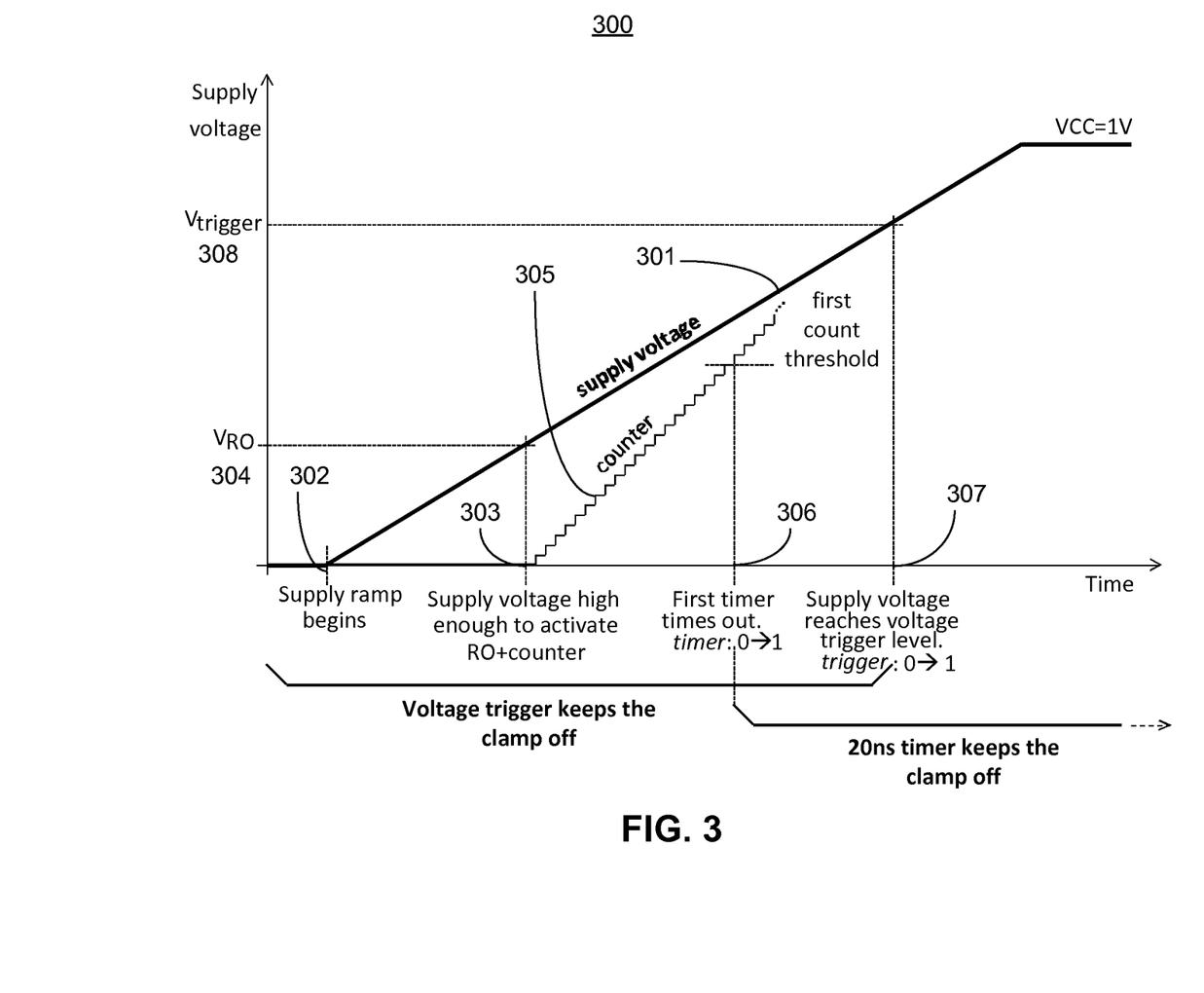
FIG. 3 is an operation of the ESD circuit during a fast ramping power supply, according to one embodiment of the disclosure.

FIG. 3 is a plot 300 illustrating an operation of the ESD circuit 200 during a fast ramping power supply, according to one embodiment of the disclosure. FIG. 3 is described with reference to FIGS. 1-2. The plot 300 illustrates that the ESD circuit 200 keeps the clamp transistor MP1 off during a ramp of the power supply by distinguishing the fast ramping power supply from an ESD event.

In one embodiment, the voltage trigger unit 103 initially keeps the clamp transistor MP1 off. In one embodiment, the clamp transistor MP1 is turned off by causing the trigger signal from the voltage trigger unit 103 to remain logically low which in turn causes the clampon signal to remain logically low. In other embodiments, the logic of the logic unit 102 may be changed so that other mechanisms may be used for keeping the clamp transistor MP1 off when the power supply level of VCC 301 is below the first threshold voltage level 308.

In one embodiment, when the power supply 301 ramp begins at time point 302, the first timer 104a starts counting at time point 303 as shown by 305. In such an embodiment, the first timer 104a starts counting at time point 303 when the level of the power supply 301 is high enough (e.g., the power supply level 301 crosses the level threshold level $V_{RO}$ 304) to cause the logic gates in the first timer 104a to operate functionally. In one embodiment, the voltage level 304 is the threshold voltage level (Vth) of the transistors of the first timer 104a. In such an embodiment, the output trigger signal from the voltage trigger unit 103 is still logically low, keeping the clamp transistor MP1 off. When the first timer 104a count reaches above the second threshold (e.g., 20 ns), the first timer 104a causes the timer signal to transition from logical low to logical high as indicated by the time point 306.

In one embodiment, as the power supply voltage 301 continues to ramp up, the power supply voltage 301 reaches the voltage trigger threshold ($V_{trigger}$) 308, also referred herein as the first voltage threshold. In one embodiment, when the power supply voltage 301 reaches or crosses $V_{trigger}$ 308, the voltage trigger 103 releases the control of the clamp transistor MP1 to the timer 104. In such an embodiment, the trigger signal from the voltage trigger 103 transitions from logical low to logical high as indicated by time point 307. Since the timer signal is already at logical high level (time point 306), the timer 104 keeps the clampon signal at logical low level by means of the timer signal being at logical high level, thus keeping the clamp transistor MP1 off. In such an embodiment, the clampon_b signal remains at logical high level while, the disable signal is at logical high level because the timer signal is at logical high level.

Figure 4:
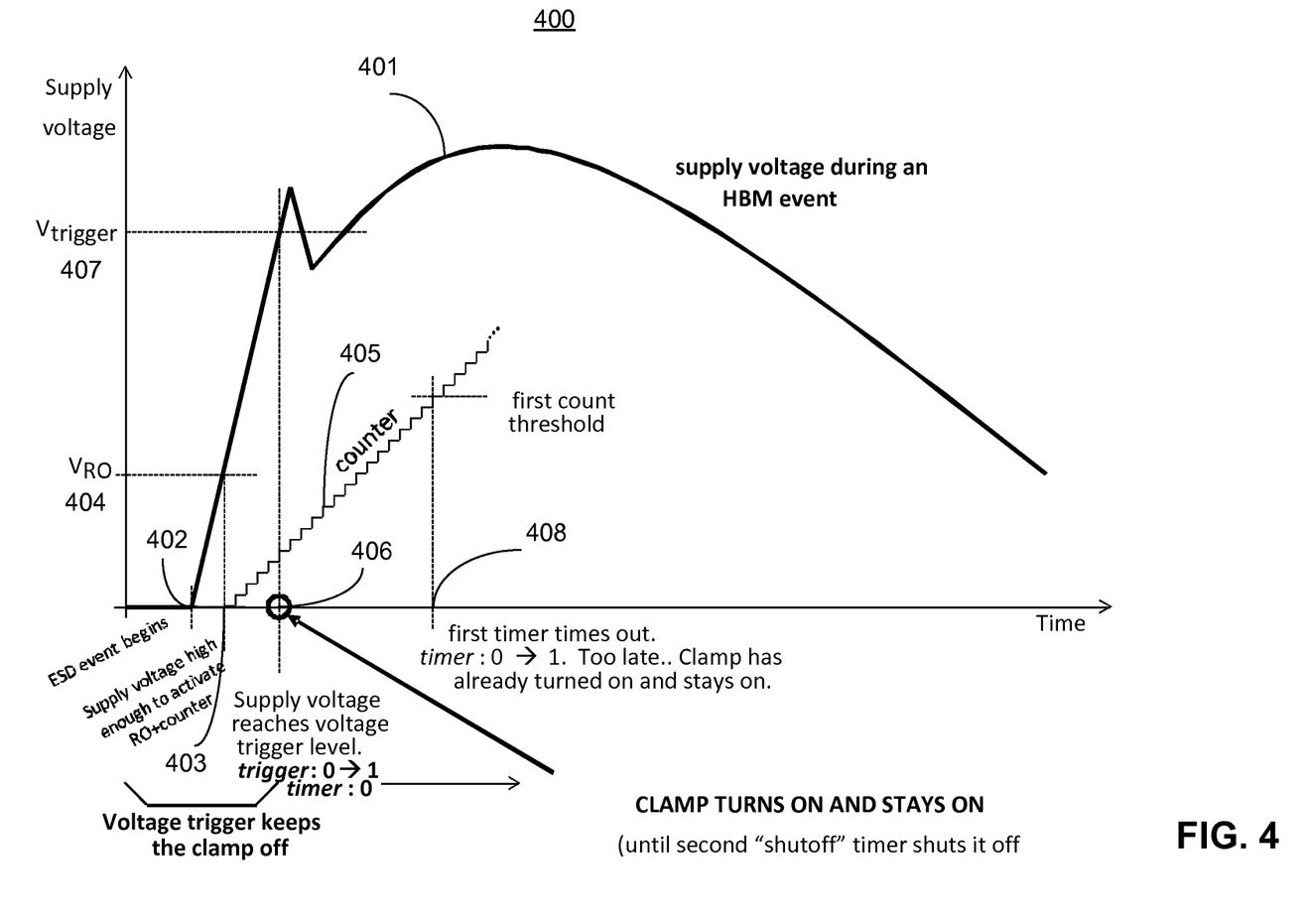
FIG. 4 is an operation of the ESD circuit during an ESD event, according to one embodiment of the disclosure.

FIG. 4 is plot 400 illustrating an operation of the ESD circuit 200 during an ESD event, according to one embodiment of the disclosure. FIG. 4 is described with reference to FIGS. 1-3. The plot 400 illustrates that the ESD circuit 200 causes the clamp transistor MP1 to turn on during an ESD event by distinguishing the fast ramping power supply from the ESD event.

In one embodiment, when an ESD event occurs at time point 402, the power supply voltage 401 increases significantly faster than a regular fast ramping power supply 301. The inrush of ESD current going into the node of the power supply 401 may quickly charge up supply decoupling capacitors (not shown) until the ESD current finds a conduction path to ground.

When the power supply voltage 401 reaches or crosses the level $V_{RO}$ 404 to cause the logic gates in the timer 104 to operate functionally, the first timer 104a begins to count at time point 403 as indicated by the counter waveform 405. Compared to FIG. 3, in the embodiment of FIG. 4, the power supply voltage 401 keeps increasing quickly compared to the power supply voltage 301, thus reaching the first voltage threshold level $V_{trigger}$ 407 before the second threshold (e.g., 20 ns) i.e., before the first timer 104a reaches its threshold count corresponding to the second threshold (e.g., 20 ns). At time point 406, the voltage trigger 103 no longer keeps the transistor clamp MP1 off. In such an embodiment, since timer signal is still at logical low level and continues to cause the disable signal to remain at logical low, the clamp transistor MP1 turns on.

In one embodiment, a feedback signal (clampon_b) from the gate terminal of the clamp transistor MP1 causes the disable signal to latch to its previous value to keep the clamp transistor MP1 on. In such an embodiment, even when the timer signal transitions from logical low to logical high (as indicated by time point 408) after the first timer 104a crosses the first threshold (e.g., 20 ns count), the clamp transistor MP1 stays on until the second timer 104b causes the second signal—the shutoff signal—to transition from logical low to logical high.

In one embodiment, the second timer 104b causes the shutoff signal to transition from logical low to logical high when the second timer 104b reaches the third threshold (e.g., 2 us). In such an embodiment, when the shutoff signal transitions from logical low to logical high, the feedback latch is broken. The third threshold is selected to be sufficiently long to handle the long tail of an HBM event. In one embodiment, the first, second, and third threshold levels are programmable by software or hardware.

Figure 5:
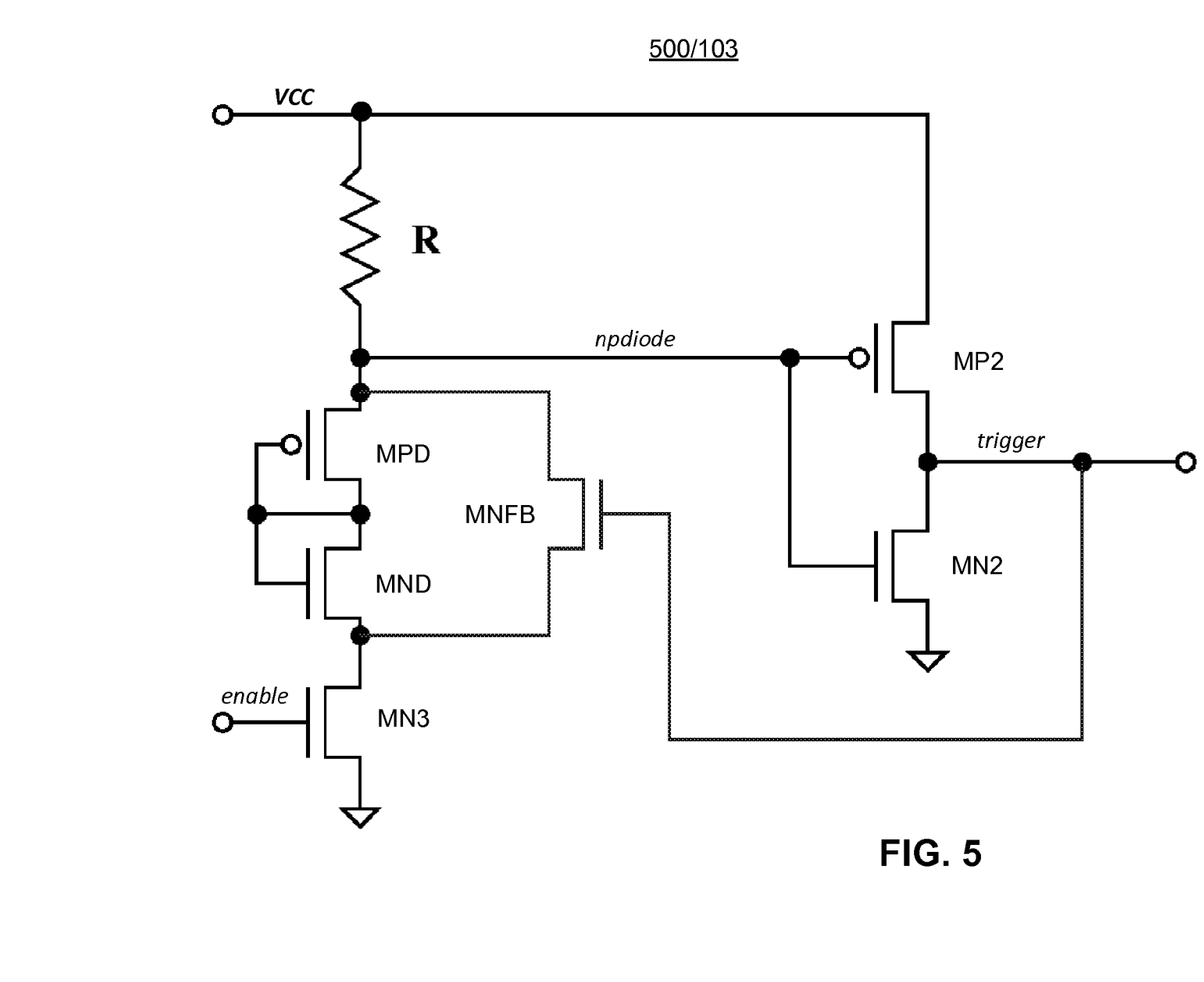
FIG. 5 is a detector for the ESD circuit, according to another embodiment of the disclosure.

FIG. 5 is a detector 500 (also referred herein as the voltage detector or voltage trigger) for the ESD circuit 100, according to another embodiment of the disclosure. In one embodiment, the voltage detector 500 comprises an inverter having transistors MP2 and MN2, a diode or diode-connected device(s) MPD and/or MND, a feedback transistor MNFB, an enable transistor MN3, and a resistive device R.

In one embodiment, the enable transistor MN3 is turned on when the enable signal is logical high. In one embodiment, the enable transistor MN3 can be disabled after the power supply ramp is complete. In such an embodiment, power dissipation of the ESD circuit 100 is lowered by eliminating the direct-current (DC) leakage current through the detector 500.

In one embodiment, a diode-connected NMOS transistor MND and diode-connected PMOS transistor MPD are coupled together as shown to determine the trigger voltage i.e., when to cause the trigger signal to transition. In other embodiments, an external signal such as the first threshold signal may be used to determine the trigger voltage.

In one embodiment, when the power supply VCC voltage increases during a normal power supply ramp or during an ESD event, the node npdiode keeps tracking the power supply VCC voltage until the voltage level of npdiode reaches a point when both diode-connected transistors MND and MPD start conducting i.e., npdiode is approximately equal to (e.g., within 10%) the sum of threshold voltages of the transistors MND and MPD (Vtp+Vtn).

In one embodiment, as the power supply voltage increases (i.e., it ramps up from low to high) the voltage level of npdiode stays at Vtp+Vtn level, and the current through the resistive device (with resistance R) increases the |Vgs| of the p-type transistor MP2. In such an embodiment, the MP2/MN2 inverter pulls the trigger signal higher i.e., the trigger signal transitions from logical low to logical high. In one embodiment, the feedback transistor MNFB shorts (or bypasses) the NMOS/PMOS diode-connected transistors MND and MPD when the trigger signal transitions from logical low to logical high. In such an embodiment, the npdiode node is pulled low, latching the trigger signal voltage high.

In one embodiment, the resistive device is a resistor (e.g., a poly silicon resistor) with resistance R. In other embodiments, the resistive device can be formed from active (e.g., transistors) or passive devices. In one embodiment, the resistance R is in the range of 10 KOhms to 100 KOhms. The voltage trigger level is a weak function of the resistance R. In one embodiment, the voltage trigger level is adjusted by adjusting the sizes (W/L) of the diode-connected transistors MND and MPD.

The diode-connected NMOS and PMOS transistors MND and MPD reduce the impact of process skew on the timer 104. In one embodiment, by making the voltage trigger level (e.g., npdiode or the first threshold) also a function of transistor threshold voltages, the difference between $V_{trigger}$ and $V_{RO}$ can be kept more stable across process skew corners.

While the embodiments herein illustrate the detector 500 with diode-connected transistors MPD and MND, other modifications are possible. For example, the diode-connected transistors MPD and MND can be replaced with a single diode-connected transistor (either MPD or MND), the diode-connected transistors MPD and MND can be replaced with one or more PN junction diodes or one or more BJT devices (NPN and/or PNP). In one embodiment, the enable transistor MN3 is removed. In such an embodiment, the source of transistor MND is coupled to ground.

Figure 6:
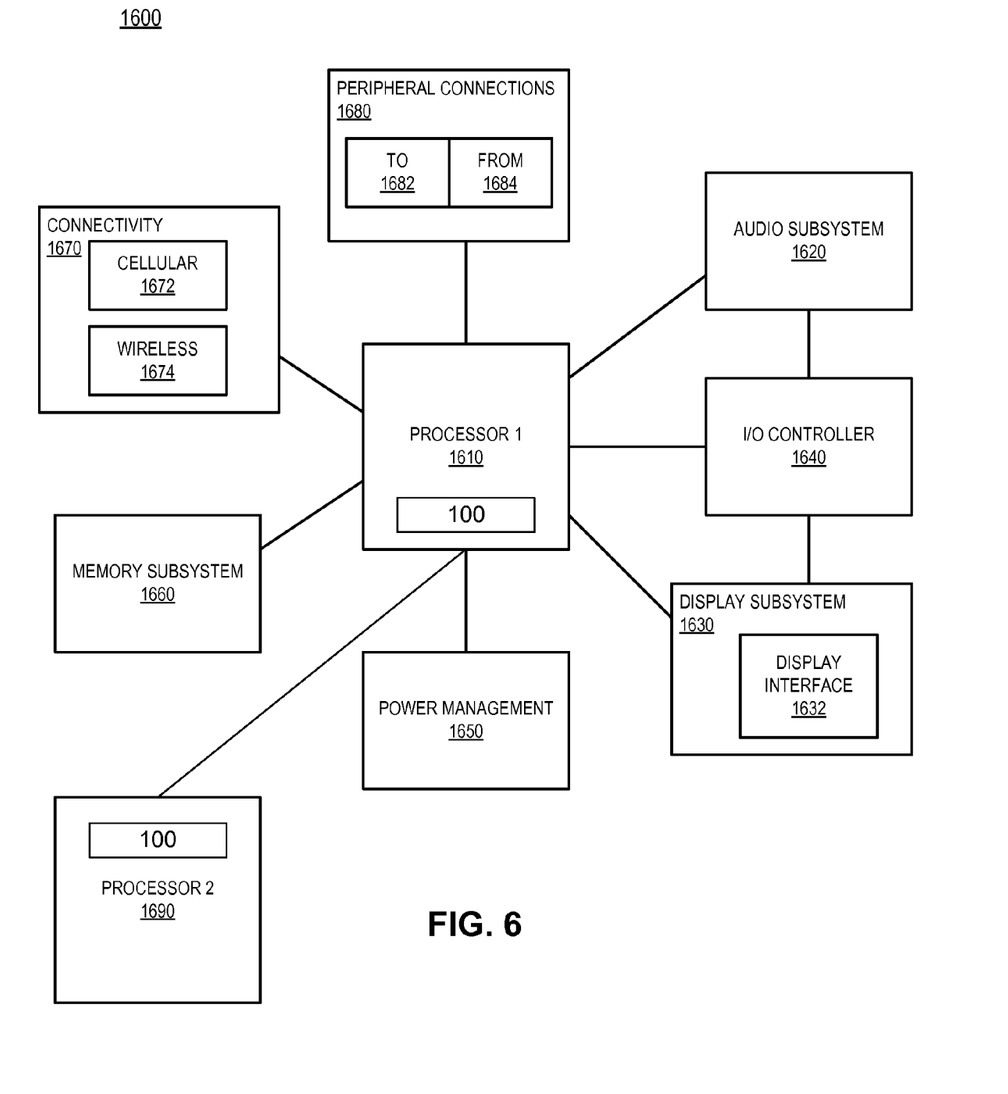
FIG. 6 is a system-level diagram of a smart device comprising a processor with the ESD circuit, according to one embodiment of the disclosure.

FIG. 6 is a system-level diagram of a smart device 1600 comprising a processor with the ESD circuit, according to one embodiment of the disclosure. FIG. 6 also illustrates a block diagram of an embodiment of a mobile device in which flat surface interface connectors could be used. In one embodiment, the computing device 1600 represents a mobile computing device, such as a computing tablet, a mobile phone or smart-phone, a wireless-enabled e-reader, or other wireless mobile device. It will be understood that certain of the components are shown generally, and not all components of such a device are shown in device 1600.

In one embodiment, the computing device 1600 includes a first processor 1610 with the ESD circuit 100 and a second processor 1690 with the ESD circuit 100, according to the embodiments discussed herein. The ESD circuit 100 may be placed in any suitable area to provide maximum ESD protection to the circuits of the processors.

The various embodiments of the present disclosure may also comprise a network interface within 1670 such as a wireless interface so that a system embodiment may be incorporated into a wireless device, for example, cell phone or personal digital assistant.

In one embodiment, the processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, the computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to device 1600 through which a user might interact with the system. For example, devices that can be attached to the computing device 1600 might include microphone devices, speaker or stereo systems, video systems or other display device, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem includes a touch screen, the display device also acts as an input device, which can be at least partially managed by I/O controller 1640. There can also be additional buttons or switches on the computing device 1600 to provide I/O functions managed by I/O controller 1640.

In one embodiment, the I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, the computing device 1600 includes power management 1650 that manages battery power usage, charging of the battery, and features related to power saving operation. Memory subsystem 1660 includes memory devices for storing information in device 1600. Memory can include nonvolatile (state does not change if power to the memory device is interrupted) and/or volatile (state is indeterminate if power to the memory device is interrupted) memory devices. Memory 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 1674 refers to wireless connectivity that is not cellular, and can include personal area networks (such as Bluetooth, Near Field, etc), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on device 1600. Additionally, a docking connector can allow device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

The ESD circuit 100 discussed herein can be used for wireless circuits. In one embodiment, ESD circuit 100 is used in blocks 1670, 1680, 1620, 1640, and 1630 to protect the circuits in these blocks from ESD events while allowing fast ramping power supplies to operate without causing the ESD circuit to clamp the power supplies.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the disclosure has been described in conjunction with specific embodiments thereof, many alternatives, modifications and variations of such embodiments will be apparent to those of ordinary skill in the art in light of the foregoing description.

For example, the clamp transistor MP1 can be replaced with an n-type transistor (e.g., an NMOS) and the logic unit 102 can be redesigned to generate a control voltage for controlling the gate of the NMOS in the same manner as discussed herein for the PMOS transistor MP1.

In one alternative embodiment, the first timer 104a is implemented with passive devices like resistors-capacitors (RC timer). In such an embodiment, the detector 103 can be eliminated or disabled because the RC timer will begin to operate regardless of the power supply level reaching the first threshold level.

Figure 7:
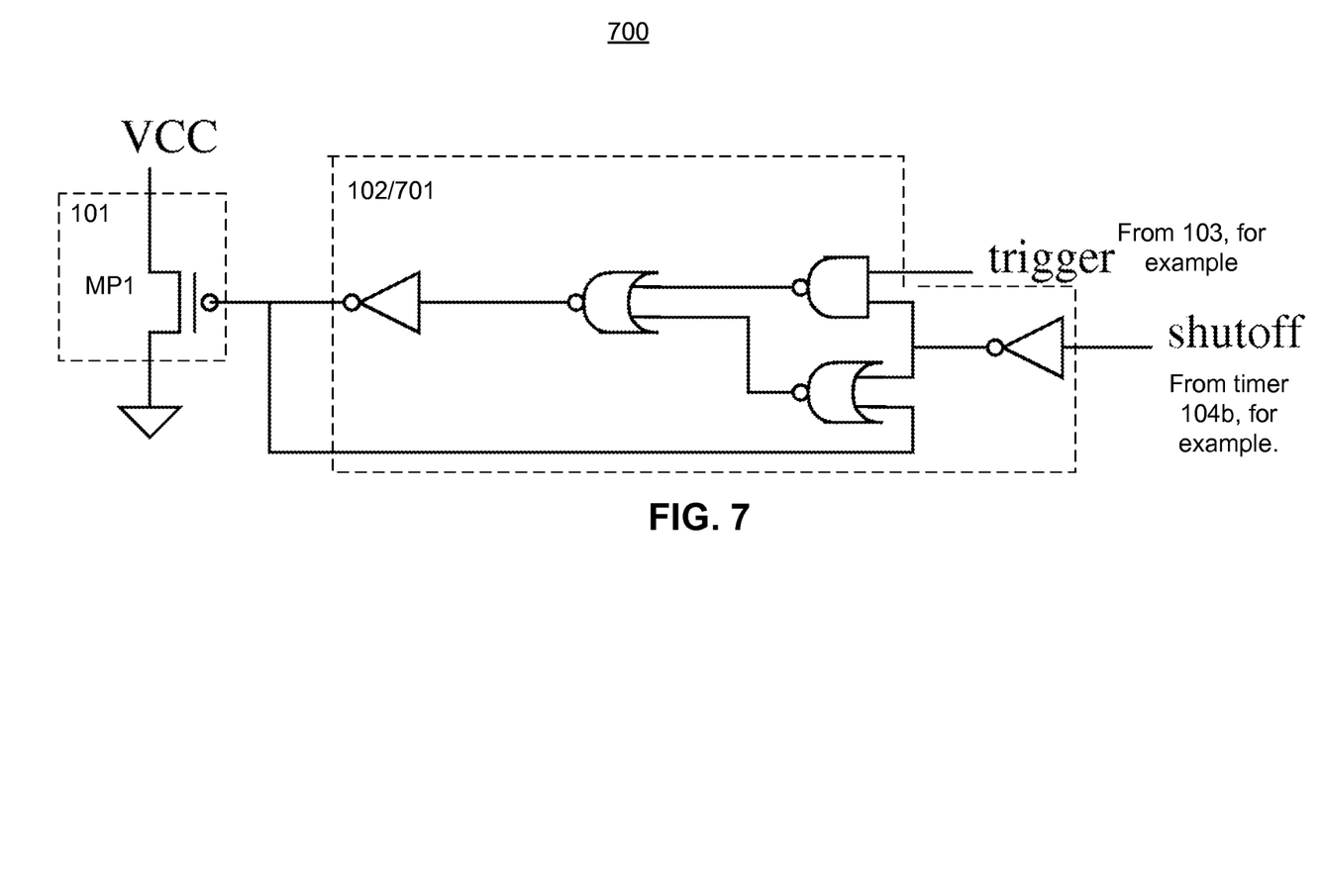
FIG. 7 is an ESD circuit, according to another embodiment of the disclosure.

FIG. 7 is an ESD circuit 700, according to one embodiment of the disclosure. In this embodiment, the first timer 104a may not be used and the clamp transistor MP1 turns on when the power supply voltage reaches the trigger voltage level, $V_{trigger}$. In this embodiment, the $V_{trigger}$ voltage level is designed to be more than normal operating voltage of the power supply. In one embodiment, the logic unit 102/701 is modified so that the clamp transistor MP1 is off during fast ramping power supplies in a non-ESD event environment. The logic unit 102/701 continues to cause the clamp transistor MP1 to turn on when an ESD event occurs (when VCC reaches $V_{trigger}$). The clamp transistor MP1 remains on until the shutoff signal transitions from logical low to high indicating that the ESD event has passed/finished. The trigger signal is used to detect ESD event and can be derived from circuit similar to 103. In this embodiment, the timer 104b is used to generate the shutoff signal to turn the clamp off after ESD event is over.

Figure 8:
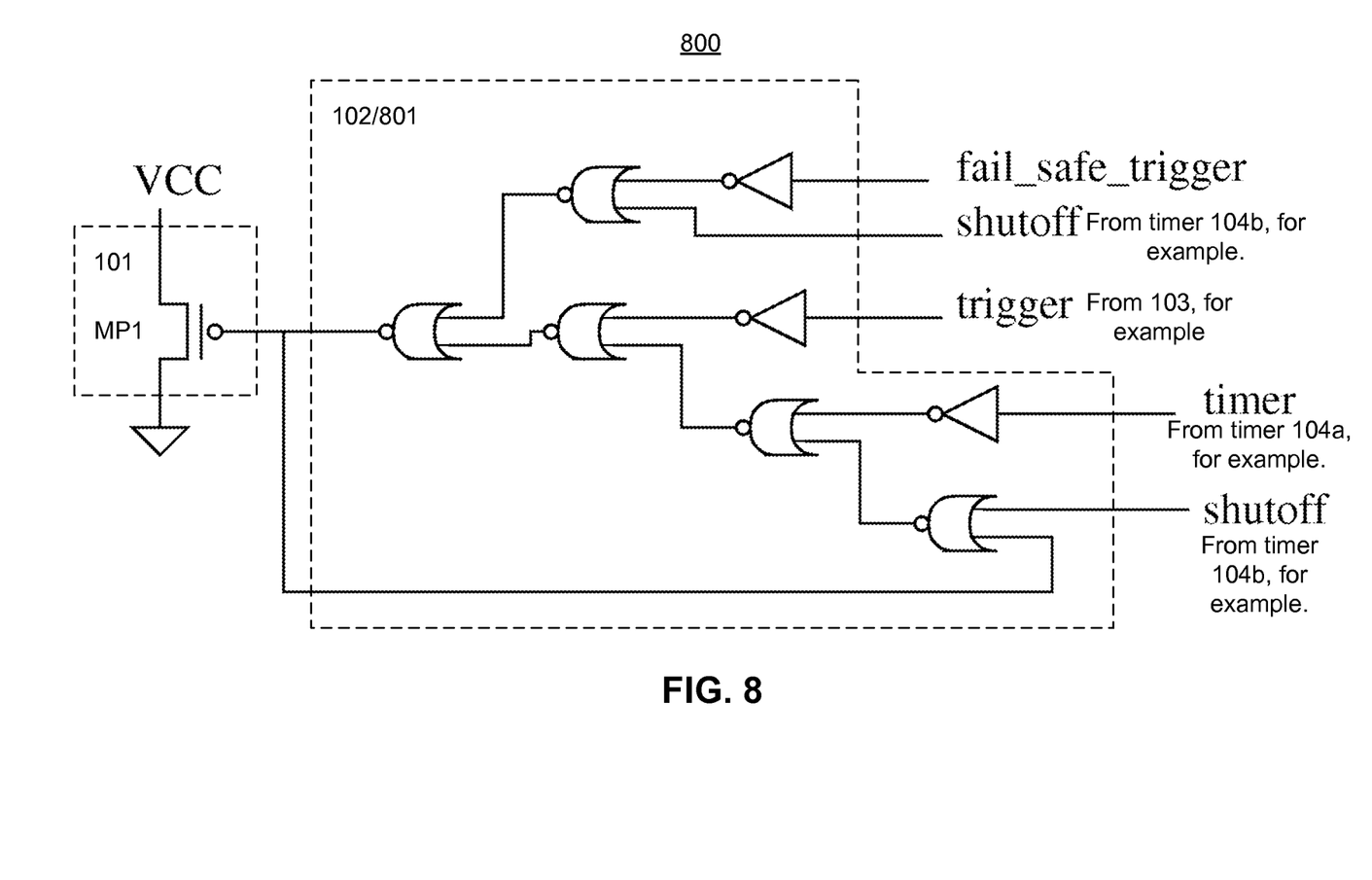
FIG. 8 is an ESD circuit, according to another embodiment of the disclosure.

FIG. 8 is an ESD circuit 800, according to another embodiment of the disclosure. In this embodiment, two detectors are used—one for generating the trigger signal as generated by the detector 103, and the other for generating the fail_safe_trigger signal where fail_safe_trigger_voltage is more than normal operating voltage of power supply. The logic unit 102/801 continues to cause the clamp transistor MP1 to turn on when an ESD event occurs. However, during an ESD event that resembles a fast power supply ramp i.e. a slow HBM ESD event, the logic 102/801 will keep the clamp off. In such case, in this embodiment, the fail_safe_trigger signal from the second detector (similar to 103, but not shown) ensures that the logic 102/801 turns on the clamp transistor MP1. In this embodiment, the logic unit 102/801 continues to cause the clamp transistor MP1 to remain off (by means of the trigger signal and timer signal) during a fast power supply ramp. In this embodiment, as the fast ramped power supply voltage will not cross the fail_safe_trigger value, the clamp transistor MP1 is kept off by logic unit 102/801.

In one embodiment, the detector 103 can be implemented as a slew-rate detector that can detect a slope/ramp of a power supply signal. Furthermore, the timers discussed herein can be implemented with an RC based timer or all-digital timer (e.g., with ring oscillator) or any other timer.

In one embodiment, the first threshold (voltage threshold) for the detector 103 or the size of the resistance R of the voltage detector 500 is adjusted so that the voltage trigger point is higher than the nominal supply voltage (e.g., 1V). In such an embodiment, the first timer 104a (which counts up to, for example, 20 ns) can be eliminated. In this embodiment, the clamp transistor MP1 101 turns on whenever the power supply voltage goes beyond the nominal voltage. In such an embodiment, the clamp circuit can handle infinitely fast power supply ramps. In one embodiment, the nominal supply voltage is set to less than 0.7V to keep the initial voltage peak low enough in ESD events.

The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented i.e., such specifics should be well within purview of one skilled in the art. Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment the apparatus comprises: a clamp transistor with a terminal coupled to a node with a power supply; and a detector to determine when the power supply crosses a first threshold, the detector to generate a trigger signal to cause the clamp transistor to remain off when the power supply on the node is below the first threshold.

In one embodiment, the detector is operable to generate the trigger signal to cause the clamp transistor to turn on when the power supply crosses the first threshold. In one embodiment, the apparatus further comprises a timer to generate a first signal to cause the clamp transistor to remain off when the first signal indicates a value below a second threshold. In one embodiment, the clamp transistor is operable to turn on when the power supply crosses the first threshold and when first signal indicates a value below the second threshold. In one embodiment, the timer is operable to generate a second signal to cause the clamp transistor to turn off when the second signal indicates a value above a third threshold, wherein the third threshold is larger than the second threshold. In one embodiment, the first threshold is a voltage threshold, and wherein the trigger signal is a voltage trigger signal. In one embodiment, the second and third thresholds are timing thresholds.

In one embodiment, the timer comprises at least one of: a resistor-capacitor (RC) network; a counter; or an oscillator (e.g., ring oscillator).

In one embodiment, the detector is a slew rate detector. In one embodiment, the detector comprises: a diode-connected transistor; an inverter, coupled to the diode-connected transistor, to generate the trigger signal; and a resistive device coupled to the node with the power supply, the diode-connected transistor, and the inverter. In one embodiment the apparatus comprises a transistor operable to bypass the diode-connected transistor according to an output of the inverter. In one embodiment, the diode-connected transistor is at least one of: an n-type diode connected transistor; a p-type diode connected transistor; a p-type diode-connected transistor coupled to the n-type diode-connected transistor; or a diode. In one embodiment, the clamp transistor is a p-type transistor. In one embodiment, the clamp transistor is an n-type transistor.

In another example, in one embodiment the apparatus comprises means for clamping a power supply on a node; and means for detecting when the power supply crosses a first threshold, the means for detecting to generate a trigger signal to cause the means for clamping to remain disabled when the power supply is below the first threshold. In one embodiment, the means for detecting to generate the trigger signal to cause the means for clamping to clamp the power supply when the power supply crosses the first threshold. In one embodiment, the apparatus further comprises means for generating a first signal to cause the means for clamping to remain disabled when the first signal indicates a value below a second threshold. In one embodiment, the means for clamping to clamp the power supply when the power supply crosses the first threshold and when first signal indicates a value below the second threshold. In one embodiment, the apparatus further comprises means for generating a second signal to cause the means for clamping to disable clamping of the power supply when the second signal indicates a value above a third threshold, wherein the third threshold is larger than the second threshold.

In another example, in one embodiment a system comprises: a processor comprising an electrostatic discharge (ESD) unit, the ESD unit including the apparatus discussed herein; and a wireless antenna to allow the processor to communicate with other devices. In one embodiment, the system further comprises a display unit communicatively coupled to the processor and the wireless antenna.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
    a clamp transistor with a terminal coupled to a node with a power supply;
    a detector to determine when the power supply crosses a first voltage threshold, the detector to generate a trigger signal to cause the clamp transistor to remain off when the power supply on the node is below the first voltage threshold; and
    a timer to generate a first signal to cause the clamp transistor to remain off when the first signal indicates a value above a first time threshold, wherein the timer begins counting in response to the power supply reaching a second voltage threshold, wherein the timer is operable to generate a second signal to cause the clamp transistor to turn off when the second signal indicates a value above a second time threshold, wherein the second time threshold is larger than the first time threshold.

2. The apparatus of claim 1, wherein the detector is operable to generate the trigger signal to cause the clamp transistor to turn on when the power supply crosses the first voltage threshold.

3. The apparatus of claim 1, wherein the clamp transistor is operable to turn on when the power supply crosses the first voltage threshold and when the first signal indicates a value below the first time threshold.

4. The apparatus according to claim 1, wherein the timer comprises at least one of:
- a resistor-capacitor (Re) network;
- a counter; or
- an oscillator.

5. The apparatus of claim 1, wherein the detector is a slew rate detector.

6. The apparatus of claim 1, wherein the detector comprises:
- a diode-connected transistor;
- an inverter, coupled to the diode-connected transistor, to generate the trigger signal; and
- a resistive device coupled to the node with the power supply, the diode-connected transistor, and the inverter.

7. The apparatus of claim 6 further comprises a transistor operable to bypass the diode-connected transistor according to an output of the inverter.

8. The apparatus of claim 6,
wherein the diode-connected transistor is at least one of:
- an n-type diode connected transistor;
- a p-type diode connected transistor;
- a p-type diode-connected transistor coupled to the n-type diode-connected transistor; or
- a diode.

9. The apparatus of claim 1, wherein the clamp transistor is a p-type transistor.

10. The apparatus of claim 1, wherein the clamp transistor is an n-type transistor.

11. The apparatus of claim 1, wherein the trigger signal is a voltage trigger signal.

12. An apparatus comprising:
- means for clamping a power supply on a node; and
- means for detecting when the power supply crosses a first voltage threshold, the means for detecting to generate a trigger signal to cause the means for clamping to remain disabled when the power supply is below the first voltage threshold;
- means for generating a first signal to cause the means for clamping to remain disabled when the first signal indicates a value above a first time threshold, wherein the means for generating the first signal begins operation in response to the power supply reaching a second voltage threshold; and
- means for generating a second signal to cause the means for clamping to disable clamping of the power supply when the second signal indicates a value above a second time threshold, wherein the second time threshold is larger than the first time threshold,
wherein the means for clamping to clamp the power supply when the power supply crosses the first voltage threshold and when first signal indicates a value below the first time threshold.

13. The apparatus of claim 12, wherein the means for detecting to generate the trigger signal to cause the means for clamping to clamp the power supply when the power supply crosses the first voltage threshold.

14. A system comprising:
a processor comprising an electrostatic discharge (ESD) unit, the ESD unit including:
- a clamp transistor with a terminal coupled to a node with a power supply;
- a detector to determine when the power supply crosses a first voltage threshold, the detector to generate a trigger signal to cause the clamp transistor to remain off when the power supply on the node is below the first voltage threshold the apparatus;
- a timer to generate a first signal to cause the clamp transistor to remain off when the first signal indicates a value above a first time threshold, wherein the timer begins counting in response to the power supply reaching a second voltage threshold, wherein the timer is operable to generate a second signal to cause the clamp transistor to turn off when the second signal indicates a value above a second time threshold, wherein the second time threshold is larger than the first time threshold, and
a wireless antenna to allow the processor to communicate with other devices.

15. The system of claim 14 further comprises a display unit communicatively coupled to the processor and the wireless antenna.

16. The system of claim 14, wherein the detector is operable to generate the trigger signal to cause the clamp transistor to turn on when the power supply crosses the first voltage threshold.

17. The system of claim 14, wherein the detector comprises:
- a diode-connected transistor;
- an inverter, coupled to the diode-connected transistor, to generate the trigger signal; and
- a resistive device coupled to the node with the power supply, the diode-connected transistor, and the inverter.

\* \* \* \* \*